US011276368B2

(12) United States Patent
Tao et al.

(10) Patent No.: US 11,276,368 B2
(45) Date of Patent: Mar. 15, 2022

(54) TECHNIQUES FOR APPLYING COLOR TRANSFORMS IN RENDERING VISUAL CONTENT

(71) Applicant: Microsoft Technology Licensing, LLC, Redmond, WA (US)

(72) Inventors: Simon Young Tao, Redmond, WA (US); Rajat Jain, Sammamish, WA (US); Guangwen Yang, Bellevue, WA (US); David Foster Spruill, Kenmore, WA (US); Zachary Scott Northrup, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/563,384

(22) Filed: Sep. 6, 2019

(65) Prior Publication Data

US 2021/0074239 A1  Mar. 11, 2021

(51) Int. Cl.
*G09G 5/06* (2006.01)
*G06T 1/20* (2006.01)

(52) U.S. Cl.
CPC ............... *G09G 5/06* (2013.01); *G06T 1/20* (2013.01); *G09G 2320/0666* (2013.01); *G09G 2340/06* (2013.01)

(58) Field of Classification Search
CPC ............... G09G 5/06; G09G 2340/06; G09G 2320/0666; G06T 1/20
See application file for complete search history.

(56) References Cited

U.S. PATENT DOCUMENTS

| 6,498,610 | B1 | 12/2002 | Glaspy, Jr. | |
| 7,266,238 | B2 | 9/2007 | Haikin | |
| 8,373,883 | B2 | 2/2013 | Hoarau et al. | |
| 8,743,407 | B2 | 6/2014 | Shinchi | |
| 9,224,227 | B2 | 12/2015 | Meixner | |
| 9,516,288 | B2 | 12/2016 | Holub | |
| 10,074,159 | B2* | 9/2018 | Khorasani | G06T 17/20 |
| 2010/0103438 | A1* | 4/2010 | Hauf | H04N 1/6083 |
| | | | | 358/1.9 |
| 2012/0081577 | A1* | 4/2012 | Cote | H04N 9/04557 |
| | | | | 348/231.99 |
| 2015/0138228 | A1* | 5/2015 | Lum | G06T 15/005 |
| | | | | 345/611 |

(Continued)

FOREIGN PATENT DOCUMENTS

WO    9531794 A1    11/1995

OTHER PUBLICATIONS

"Color Management", Retrieved From https://helpx.adobe.com/in/after-effects/using/color-management.html, Retrieved Date Jul. 15, 2019, 25 Pages.

*Primary Examiner* — Samantha (Yuehan) Wang
(74) *Attorney, Agent, or Firm* — Arent Fox LLP (57) ABSTRACT

Examples described herein generally apply color transforms to visual content. A set of color transforms in a graphics pipeline that are requested by a plurality of applications can be determined. At least one of the set of color transforms or an ordering of the set of color transforms can be modified, based on one or more arbitration rules, to generate an arbitrated set of color transforms. The visual content can be generated for display based at least in part on applying the arbitrated set of color transforms in the graphics pipeline.

20 Claims, 5 Drawing Sheets

(56) References Cited

U.S. PATENT DOCUMENTS

2015/0287389 A1\* 10/2015 Mese ................. G09G 5/10
 345/207
2019/0204901 A1\* 7/2019 Ramadoss ............ G06F 1/3293

\* cited by examiner

TECHNIQUES FOR APPLYING COLOR TRANSFORMS IN RENDERING VISUAL CONTENT

BACKGROUND

Use of computing devices is becoming more ubiquitous by the day. Computing devices range from standard desktop computers to wearable computing technology and beyond. Computing devices typically include one or more display devices for displaying visual content as output to a user, and the computing devices typically include hardware for generating the visual content for display, such as a graphics processing unit (GPU) or other processors. An operating system of the computing device can execute a graphics driver to communicate rendering instructions to the GPU to cause display of visual content. In addition, the operating system may execute one or more applications that can cause applying of one or more color transforms to visual content to be displayed on the display device. Examples of the applications can include a color calibration application that can calibrate the display device based on colormetric measurements so the visual content can appear consistent across display devices. Other examples of the applications can include blue light reduction applications that allow for output of warmer colors with reduced blue hues, to provide a more pleasing effect at night. Other examples of the applications can include applications providing ambient whitepoint adaptation, color blindness accessibility, brightness and/or contrast adjustment, gamma lookup tables, etc.

For a given application, the operating system, graphics driver, or other function can transform the input visual content using one or more color transforms to produce an output visual content. The color transforms may be part of a graphics pipeline for transforming the visual content and may be exposed by the operating system and/or graphics driver to allow the applications to instantiate one or more color transforms in the graphics pipeline. The color transforms can be of varying complexity, such as a 1-dimensional lookup table (LUT), a 3-dimensional LUT, a parametric function, a matrix, etc. A given application may use one or more of the color transforms available in the graphics pipeline.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for applying color transforms to visual content is provided. The method includes determining a set of color transforms in a graphics pipeline that are requested by a plurality of applications, modifying, based on one or more arbitration rules, at least one of the set of color transforms or an ordering of the set of color transforms to generate an arbitrated set of color transforms, and generating the visual content for display based at least in part on applying the arbitrated set of color transforms in the graphics pipeline.

In another example, a computing device for applying color transforms to visual content is provided that includes a memory storing one or more parameters or instructions for executing an operating system and a plurality of applications, a display interface coupled with the display device for communicating signals to display visual content on the display device, and at least one processor coupled to the memory and the display interface. At least one processor is configured to determine a set of color transforms in a graphics pipeline that are requested by the plurality of applications, modify, based on one or more arbitration rules, at least one of the set of color transforms or an ordering of the set of color transforms to generate an arbitrated set of color transforms, and generate the visual content for display based at least in part on applying the arbitrated set of color transforms in the graphics pipeline.

In another example, a computer-readable medium, including code executable by one or more processors for applying color transforms to visual content is provided. The code includes code for determining a set of color transforms in a graphics pipeline that are requested by a plurality of applications, modifying, based on one or more arbitration rules, at least one of the set of color transforms or an ordering of the set of color transforms to generate an arbitrated set of color transforms, and generating the visual content for display based at least in part on applying the arbitrated set of color transforms in the graphics pipeline.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to managing a set of color transforms to be applied in rendering visual content, which may include one or more images, a desktop, text, video, etc. In digital graphics, many scenarios may benefit from applying a color transform to visual color content (e.g. images, videos, text, etc.). Some examples are adding a color tint, adjusting contrast, or calibrating for a display. In a modern computing device, multiple applications or scenarios may simultaneously apply different color transforms. For example, an image editor may adjust contrast for a single photo, the entire device/operating environment may have a reddish tint applied to reduce the intensity of blue light, and a final frame buffer may be calibrated to optimize for the display device. In this regard, for example, one or more applications executing via an operating system can request use of or application of one or more color transforms in a graphics pipeline when rendering visual content. As multiple color transforms are requested, applying the color transforms may become complex and may consume an undesirable amount of resources, which may impact user experience, produce undesirable visual content results, and/or the like.

Aspects described herein relate to modifying a set of color transforms, an ordering of the color transforms in the set, etc., to be applied in the graphics pipeline to achieve desirable results. For example, an arbitration layer can be provided to manage the set of color transforms, which may include modifying the set of color transforms, as described, based on one or more arbitration rules to provide a different arbitrated set of color transforms to be applied in generating visual content for display. For example, the set of color transforms may include lookup tables (LUTs), parametric functions, matrices, etc. that can be applied to color values (e.g., red, green, blue color values of each pixel of the visual content) to transform colors in the visual content. The arbitration layer can modify an ordering of color transforms requested by one or more applications, modify a given color transform to reduce complexity thereof, merge multiple color transforms to generate single color transform, and/or the like, as described herein, to achieve a more desirable performance for, and/or result from, the graphics pipeline. Additionally, application may specify requirements or parameters for the color transforms, such as numerical accuracy, numerical precision, size of a LUT, number of coefficients, type of interpolation, etc., which the arbitration layer may consider in modifying the ordering or set of color transforms.

Figure 1:
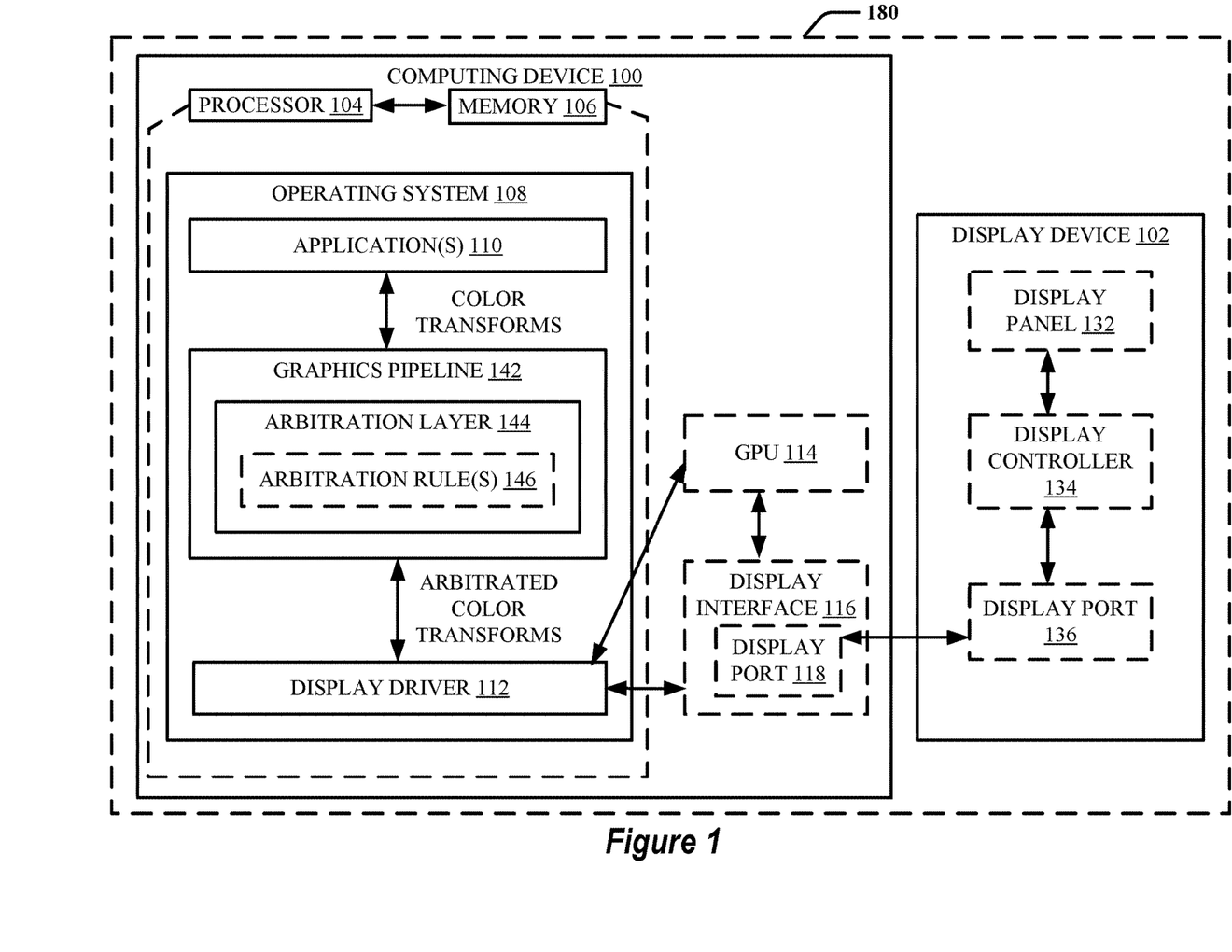
FIG. 1 is a schematic diagram of an example of a computing device and display device communicatively coupled for displaying visual content in accordance with examples described herein.
Figure 2:
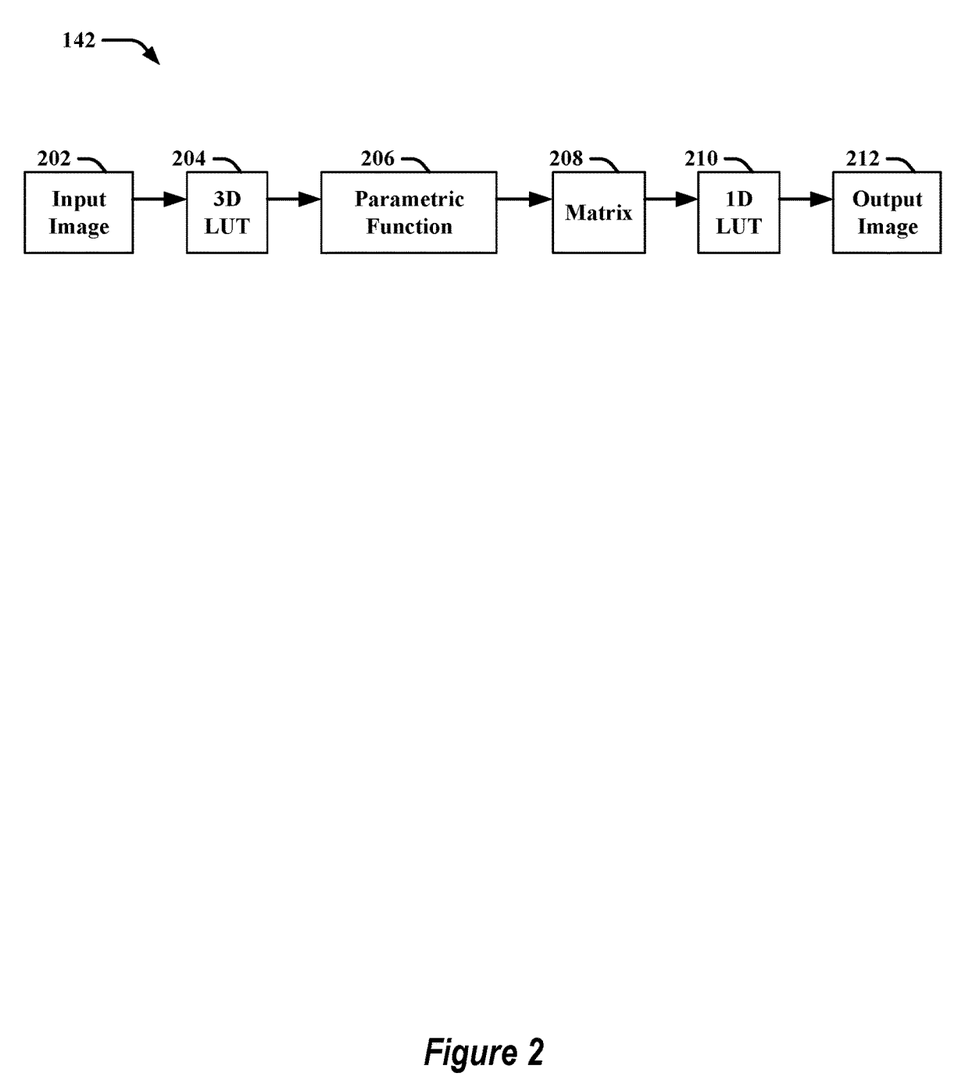
FIG. 2 illustrates a schematic diagram of an example of a graphics pipeline in accordance with examples described herein.
Figure 3:
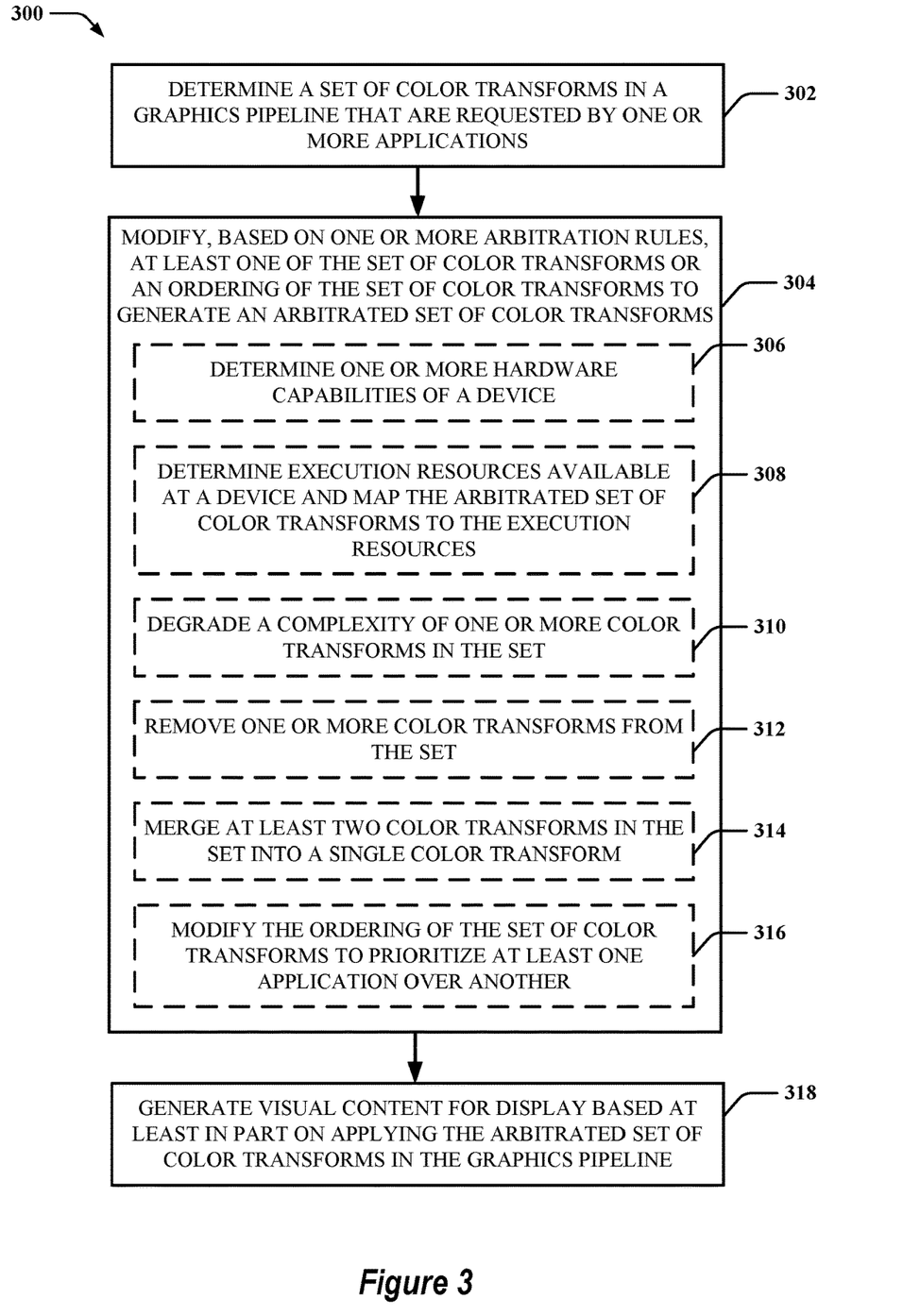
FIG. 3 is a flow diagram of an example of a method for applying color transforms to visual content in accordance with examples described herein.
Figure 4:
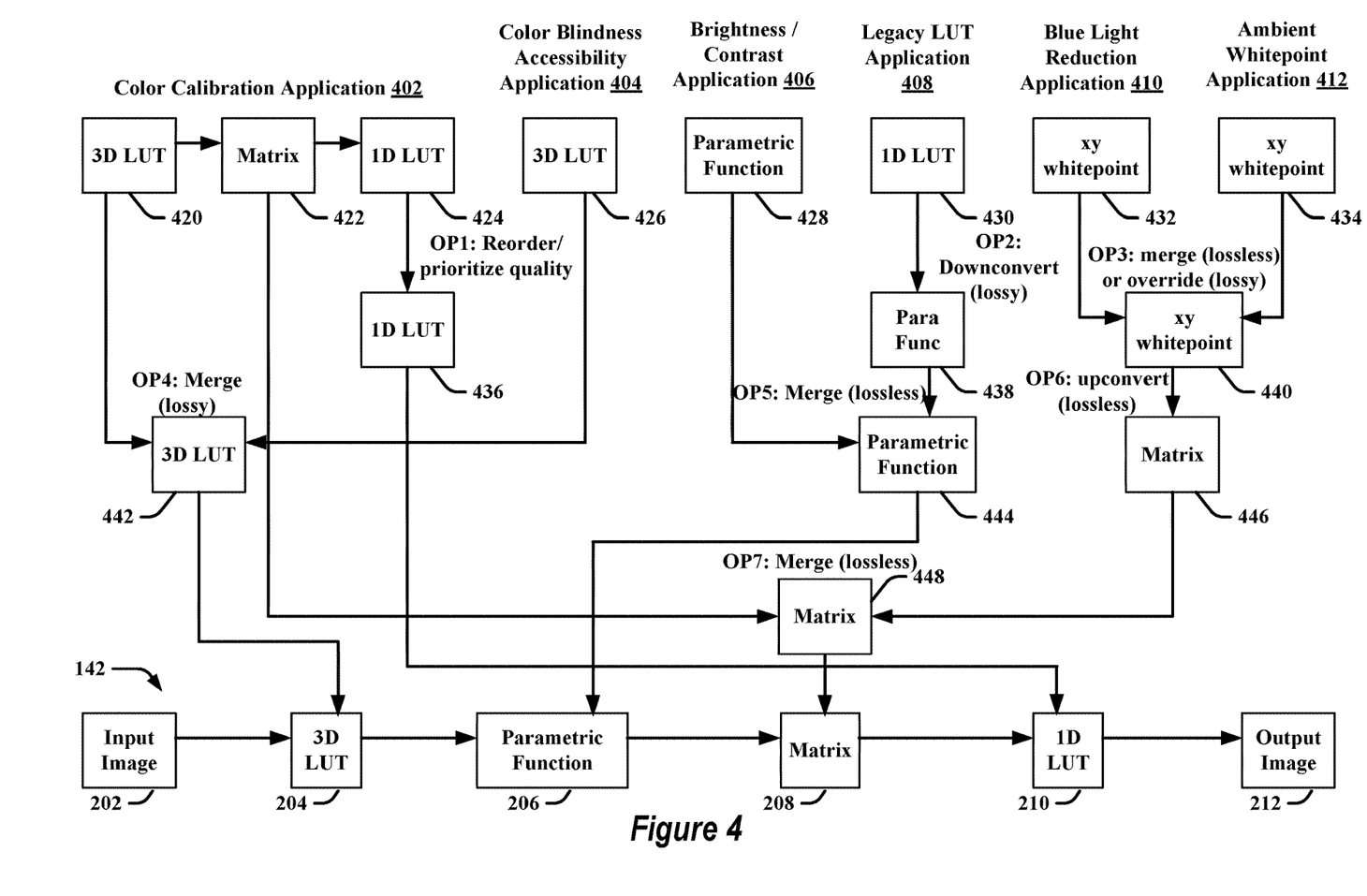
FIG. 4 illustrates schematic diagrams of an example of multiple applications requesting color transforms of a graphics pipeline in accordance with examples described herein.

Turning now to FIGS. 1-4, examples are depicted with reference to one or more components and one or more methods that may perform the actions or operations described herein, where components and/or actions/operations in dashed line may be optional. Although the operations described below in FIGS. 2-4 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100, display device 102, and/or related components, which can communicate visual content data for displaying visual content on the display device 102. For example, the display device 102 may be an internal display that is within the same housing 180 as computing device 100, a display device that is external to computing device 100, and/or the like. In addition, for example, display device 102 may be coupled to computing device 100 via a display port, a wired or wireless network connection, etc. Display device 102 can be capable of displaying a two-dimensional display, such as a desktop, a three-dimensional world, etc.

For example, computing device 100 can include or can otherwise be coupled with a processor 104 and/or memory 106, where the processor 104 and/or memory 106 can be configured to execute or store instructions or other parameters related to communicating visual content data to the display device 102 for displaying, as described herein. Computing device 100 can execute an operating system 108 (e.g., via processor 104 and/or memory 106) for providing an environment for executing one or more applications 110, such as one or more applications 110 that produce or otherwise obtain visual content for display by the display device 102. For example, one or more applications 110 can provide different color scenarios for adjusting display of visual content on display device 102, such as a color calibration application to calibrate the visual content for display on display device 102 (e.g., based on one or more limitations in color space of the display device 102) to achieve consistent display of the visual content across display devices. In other examples, the application(s) 110 can include a blue light reduction application that reduces blue light of visual content to provide a more pleasing visual content at night, an ambient whitepoint adaptation application that adjusts visual content based on ambient light to achieve a consistent display of the visual content in different levels of measured ambient light, a color blindness accessibility application that can adjust colors of visual content to be more visible for eyes that are color blind, a brightness and/or contrast adjustment application that adjusts brightness or contrast of a display based on personal preference, a legacy gamma LUT, and/or other applications. The operating system 108 can also include a display driver 112 for communicating with a GPU 114 and/or with a display interface 116 of the computing device 100 (e.g., directly or via GPU 114) to cause rendering of visual content (e.g., one or more images) for display on the display device 102.

In an example, display interface 116 can be communicatively coupled with the processor 104 and/or memory 106 for communicating with the display device 102 via a display port 118. Display port 118, as referred to herein, can include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and display device 102.

For example, display device 102 can include a display panel 132 for displaying visual content based on signals received from a display controller 134. For example, the display panel 132 can include a CRT, LCD (which can include a light emitting diode (LED) backlit LCD display), organic LED (OLED) display, digital light processing (DLP) display, etc. Display device 102 can include, but is not limited to, a head-mounted display having a single display panel or multiple display panels (e.g., one for each of two eyes) to view on the head-mounted display, a monitor, a television, a projector, or substantially any type of embedded, external, wireless, etc., display configured for communicating with computing device 100 via an embedded, external, or wireless display port 136. As mentioned, display controller 134 provides signals to the display panel 132 to cause display of visual content. In an example, display controller 134 can include a printed circuit board (PCB), programmable logic controller (PLC), etc., coupled with the display panel 132 to control the display panel 132 to display visual content based on commands received via display port 136. Thus, for example, display controller 134 can be or can include a processor configured for sending the signals to the display panel 132 based on visual content data (e.g., rendered image frames) received via display port 136.

In an example, computing device 100 can generate visual content data for providing to the display device 102 for displaying visual content on display panel 132. Computing device 100 can accordingly communicate the visual content data to the display device 102 via display interface 116 using display port 118 to communicate signals corresponding to the visual content data to display port 136 for providing to display controller 134. In an example, operating system 108 and/or application 110 can obtain or otherwise generate visual content for displaying on display device 102, and display driver 112 can provide rendering instructions for rendering the visual content to GPU 114 (e.g., via display interface 116 or otherwise). In one example, GPU 114 can be part of the display interface 116 (e.g., a processor on a circuit board of the display interface 116). In another example, GPU 114, display interface 116, etc., can be integrated with processor 104. Substantially any combination of hardware can be possible such that GPU 114, display interface 116, etc., can communicate with processor 104 via a bus to facilitate providing the rendering instructions from the display driver 112 executing on the processor 104 (e.g., via the operating system 108) to the GPU 114. GPU 114 can process the rendering instructions to render visual content, and can initiate display of at least a portion of the visual content on the display device 102 by transmitting associated signals to the display device 102 via display port 118 of display interface 116. The display device 102 can receive the signals generated by the GPU 114, and display controller 134 can accordingly cause display panel 132 to draw or display the visual content based on the signals.

Computing device 100 may also optionally include a graphics pipeline 142 to facilitate performing one or more color transforms on visual content before displaying the visual content on the display device 102. For example, graphics pipeline 142 can include a plurality of stages to facilitate providing different types of color transform. In an example, color transforms of the graphics pipeline 142 can be implemented in one or more of a programmable shader stage or in fixed function blocks of the GPU 114 or substantially any processor, such as a central processing unit (CPU), another processor, in display hardware, etc. An example of a graphics pipeline is illustrated in FIG. 2.

FIG. 2 illustrates an example of a graphics pipeline 142 that can include a received input image 202 (or other visual content), various color transform stages 204, 206, 208, 210, and a corresponding output image 212 (or other visual content) that is output after the stages 204, 206, 208, 210 are applied to the input image 202. The stages can include a three dimensional LUT (3D LUT) 204 (e.g., which can include color transform entries for each triplet of red, green, blue pixel values), a parametric function 206 (e.g., a single gamma function, such as output=input^gamma where gamma is an adjustable parameter), a matrix 208, and a one dimensional LUT (1D LUT) 210. In other examples, additional stages or a subset of the stages can be provided, and/or the stages may occur in different orders, etc. Graphics pipeline 142 can expose the stages to the application(s) 110 for achieving use of one or more desired color transforms (e.g., via an application programming interface (API) or other interface). For a received request for a given color transform, for example, the graphics pipeline 142 can provide or execute the color transform on an input image 202 by sending appropriate instructions to execute a corresponding shader or fixed function block (e.g., in the GPU 114) to generate the desired output (e.g., output image 212). For example, the color transforms (also referred to as the stages 204, 206, 208, 210 of the color pipeline 142) can modify individual color values for each pixel of the input image 202, such as red, green, blue pixel values in a supported color space for each pixel (e.g., for 8-bit images, an 8-bit value between 0-255 for each of red, green, and blue colors). Other color values for other types of visual content/images can be used as well.

In the specific examples described above, a color calibration application may request use of multiple stages of the color pipeline 142 (e.g., 3D LUT 204, matrix 208, 1D LUT 210) to achieve modification of color values for the input image 202 to calibrate to a certain display device 102. In another example, a blue light reduction application can use any one of a 1D LUT 210, a parametric function 206, a 3D LUT 204, or a matrix 208, or a target whitepoint (which may be used to compute a matrix 208, but is not shown in FIG. 2) to achieve a desired color (e.g., as opposed to color calibration that may use multiple stages simultaneously or otherwise, as also shown in the example in FIG. 4). An ambient whitepoint application can use any one of a 1D LUT 210, a parametric function 206, a 3D LUT 204, or a matrix 208, or a target whitepoint (which may be used to compute a matrix 208, but is not shown in FIG. 2) to achieve a desired whitepoint. A color blindness accessibility application can use any one of a 3D LUT 204 or matrix 208 to achieve a desired color. A brightness and/or contrast adjust application can use any one of a 1D LUT 210 or parametric function 206 to achieve a desired brightness and/or contrast. A legacy gamma LUT can use any one of a 1D LUT 210, 3D LUT 204, or a parametric function 206 to achieve a desired gamma level. For applications that can select any one of multiple color transforms, the selected color transform may result in varying levels of visual content quality loss, complexity, required processing resources, and/or other tradeoffs. Thus, as described further herein, one of the color transforms may be selected to achieve a tradeoff, such as where hardware capabilities or available execution resources are lower.

In any case, shaders used for providing the color transforms can typically execute an effectively unlimited/unrestricted set of color transforms but for performance reasons it may be desirable to bound the complexity of the color transform operations, as described herein. Fixed function hardware can be more limited and may be incapable of exactly expressing a desired color transform; in addition there may be more simultaneous color scenarios than available hardware resources on the computing device 100. In both cases, it may be desirable to map the desired transforms to the available execution resources in a way that desirably utilizes resources of the computing device 100 (e.g., based on capabilities of the computing device 100 while also attempting to preserve image quality. This may be performed, for example, using functional composition as described herein, and may be done so dynamically as the set of desired transforms and available execution resources can vary greatly between different devices, users, and dynamically over time. In one example, the resources can vary where a device switches between power modes, such as between high power and battery saver mode which can change available graphics pipeline resources.

Accordingly, graphics pipeline 142 can include an arbitration layer 144, which can have one or more defined arbitration rules 146 for modifying a set of requested color transforms to a different set of arbitrated color transforms based on applying the one or more arbitration rules 146. The arbitration rule(s) 146 can be defined based on hardware capability, can be defined for an application 110 or type of application 110 requesting the color transform, can be defined for the number, e.g., a count, of color transforms being requested (and/or a number, e.g., a count, of the applications 110 requesting the color transforms), can be defined for the color transform being requested, and/or the like. The arbitration rule(s) 146, for example, can modify a set of requested color transforms to remove some of the requested color transforms from the set, to merge two or more color transforms into a single color transform, to decrease complexity of a color transform, and/or the like, such to decrease processing requirements or latency, attempt to preserve image quality and/or the like, as described.

In this regard, because individual applications/scenarios may not be mutually aware of one another and/or lack coordination, the applications/scenarios may request overlapping or mutually conflicting color transforms. The arbitration layer 144 can result from or utilize global understanding of the various scenarios and arbitrate how to prioritize between scenarios and perform the above transform composition in a way that best preserves the application/scenario intent. The arbitration can include reordering transforms and dropping/ignoring transforms when needed to achieve a desired output, as described herein.

FIG. 3 is a flowchart of an example of a method 300 for modifying a set of color transforms in a graphics pipeline according to one or more arbitration rules. For example, method 300 can be performed by a computing device 100 and/or display device 102 communicatively coupled with one another and/or using a graphics pipeline 142, and is accordingly described with reference to FIGS. 1 and 2, for example.

In method 300, at action 302, a set of color transforms in a graphics pipeline that are requested by one or more applications can be determined. In an example, arbitration layer 144, e.g., in conjunction with processor 104, memory 106, operating system 108, graphics pipeline 142, etc., can determine the set of color transforms in the graphics pipeline that are requested by the one or more applications. For example, the application(s) 110 may relate to different color scenarios, as described above, and may request one or more color transforms (e.g., stages 204, 206, 208, 210) to be performed on input images 202 or other visual content to achieve the color scenario for corresponding output images 212. Multiple applications 110 can request different color transforms, which may result in excessive use of resources of computing device 100 and/or undesirable results for the output images 212. For example, applications 110 may include a color calibration application and a blue light reduction application. The order by which the color transforms are applied to the visual content may lead to different resulting visual content. For example, where the blue light reduction is applied before the color calibration, this may produce a different color visual content than where the color calibration is applied before the blue light reduction. In addition, applying the color calibration before the blue light reduction may result in a different level of reduction of the blue light than desired, which may produce undesirable output visual content. Both scenarios may depend on which stages or color transforms the different scenarios use as well, for example. Accordingly, the arbitration layer 144 can be provided to modify the set of color transforms requested by the application 110 to achieve a desirable visual content using a desirable level of computing device 100 resources.

As described, for example, the graphics pipeline 142, via operating system 108 or otherwise, can expose an API to allow the applications 110 to utilize or request the color transforms. This can allow the graphics pipeline 142 to receive and modify the set of color transforms requested and applied, as described further herein.

In method 300, at action 304, at least one of the set of color transforms or an ordering of the set of color transforms can be modified, based on one or more arbitration rules, to generate an arbitrated set of color transforms. In an example, arbitration layer 144, e.g., in conjunction with processor 104, memory 106, operating system 108, graphics pipeline 142, etc., can modify, based on one or more arbitration rules, at least one of the set of color transforms or the ordering of the set of color transforms to generate the arbitrated set of color transforms. For example, one or more arbitration rules 146 can specify a modification of an ordering of the set of color transforms, which may include reordering a set of color transforms requested by a specific application 110 as well. In another example, one or more arbitration rules 146 can specify to modify a given color transform to remove the color transform from the set, merge two or more color transforms into a single color transform, adjust parameters or complexity associated with a specific color transform, and/or the like. Moreover, as described above and further herein, the one or more arbitration rules 146 can be specific to determined hardware capabilities of the computing device 100, to the specific applications 110 or type of applications 110 requesting the color transforms, to the color transforms being requested, and/or the like.

In modifying at least one of the set of color transforms or the ordering of the set, at action 304, optionally at action 306, one or more hardware capabilities of a device can be determined. In an example, arbitration layer 144, e.g., in conjunction with processor 104, memory 106, operating system 108, graphics pipeline 142, etc., can determine the one or more hardware capabilities of the device, such as of computing device 100, GPU 114, etc., which may include indicated capabilities, resource determined to be available, and/or the like. In this example, arbitration layer 144 can modify the set of color transforms or ordering thereof based on the hardware capabilities. For example, the arbitration rule(s) 146 can specify different levels or values of hardware capabilities and different associated arbitration rules. In this example, arbitration layer 144 can determine the arbitration rules 146 to apply based on the hardware capabilities. For example, as hardware capabilities decrease, the arbitration rules 146 may indicate to drop more color transforms in the set, merge more color transforms into a single color transform, etc. In any case, the set of arbitrated color transforms can be generated based on applying one or more arbitration rules based on hardware capabilities.

In another example, in modifying at least one of the set of color transforms or the ordering of the set, at action 304, optionally at action 308, execution resources available at a device can be determined and the set of color transforms can be mapped to the execution resources. In an example, arbitration layer 144, e.g., in conjunction with processor 104, memory 106, operating system 108, graphics pipeline 142, etc., can determine the execution resources available at the device (e.g., computing device 100, GPU 114, etc.) and can map the set of color transforms to the execution resources for applying at least the arbitrated set of color transforms. For example, arbitration layer 144 can select the resources for executing each stage (e.g., color transform) in the arbitrated set of color transforms and/or determine an amount of resources available for each stage, which may be used to determine the arbitration rules 146 to apply in determining the arbitrated set of color transforms. In a specific example, where arbitration layer 144 determines that a lesser number of resources are available for matrix operations at the matrix 208 stage, arbitration rule(s) 146 may indicate to merge matrix stages for some scenarios/applications 110, remove matrix stages, etc., and arbitration layer 144 may do so to generate a lesser number of matrix 208 stages for the arbitrated set of color transforms.

In addition, in another example of modifying at least one of the set of color transforms or the ordering of the set, at action 304, optionally at action 310, a complexity of one or more color transforms in the set can be degraded. In an example, arbitration layer 144, e.g., in conjunction with processor 104, memory 106, operating system 108, graphics pipeline 142, etc., can degrade the complexity of one or more color transforms in the set. For example, arbitration layer 144 can determine, based on the arbitration rule(s) 146, to degrade complexity of an individual color transform, which may include adjusting parameters for applying the color transform (e.g., a number or density of a lookup table, matrix, etc. to be applied), switching the color transform to another type of color transform (e.g., degrading a 1D LUT to a parametric function), etc. In one example, arbitration layer 144 can reduce complexity of a LUT by reducing numeric precision or a number of entries in the LUT. In another example, arbitration layer 144 can determine, based on the arbitration rule(s) 146, to degrade complexity of a given stage in the graphics pipeline 142 by removing requested color transforms, merging requested color transforms, etc. Moreover, in an example, the one or more arbitration rules 146 can specify which stages to degrade first when resources are limited, mechanisms for degrading the stages when resources are limited, and/or the like.

In an example, as described, in modifying at least one of the set of color transforms or the ordering of the set, at action 304, optionally at action 312, one or more color transforms can be removed from the set. In an example, arbitration layer 144, e.g., in conjunction with processor 104, memory 106, operating system 108, graphics pipeline 142, etc., can remove one or more color transforms from the set to generate the arbitrated set of color transforms. For example, removing the color transform from the set may degrade complexity of the set where needed or desired based on hardware capability and/or availability of execution resources.

In an example, as described, in modifying at least one of the set of color transforms or the ordering of the set, at action 304, optionally at action 314, at least two color transforms in the set can be merged into a single color transform. In an example, arbitration layer 144, e.g., in conjunction with processor 104, memory 106, operating system 108, graphics pipeline 142, etc., can merge at least two color transforms in the set into the single color transform in the arbitrated set. For example, arbitration layer 144 can merge color transforms in a LUT stage by combining values in the table to produce a single LUT. In another example, arbitration layer 14 can merge color transforms in a matrix stage by multiplying the matrices to yield a single matrix, etc.

In an example, as described, in modifying at least one of the set of color transforms or the ordering of the set, at action 304, optionally at action 316, the ordering of the set of color transforms can be modified to prioritize at least one application over another. In an example, arbitration layer 144, e.g., in conjunction with processor 104, memory 106, operating system 108, graphics pipeline 142, etc., can modify the ordering of the set of color transforms to prioritize at least one application over another. For example, arbitration layer 144 can reorder the set of color transforms such that a specific application is prioritized for image quality by ordering it last. For example, as described, arbitration layer 144 can reorder one or more color transforms of a color calibration application to prioritize color calibration over other applications.

For the specific example applications/scenarios described above, the arbitration rules 146 may indicate to perform color transforms requested by a color calibration application last in the graphics pipeline 142, without merging the color transforms with other applications/scenarios, etc. In another specific example, the arbitration rules 146 may indicate to perform color transforms requested by a blue light reduction application with significant flexibility to merge or transform the color transforms associated therewith. The flexibility may manifest in the arbitration rules 146 such that the blue light reduction application color transforms can merge first when it is determined to merge color transforms (e.g., based on reduced hardware capability). In another specific example, the arbitration rules 146 may indicate to perform color transforms requested by a whitepoint adaptation application with significant flexibility to merge or transform the color transforms associated therewith (e.g., similar to, but with precedence over, blue light reduction applications). In another specific example, the arbitration rules 146 may indicate to perform color transforms requested by a color blindness accessibility application by possibly limiting color transform options provided via the API (e.g., possibly limit matrix operations where the color blindness accessibility application uses a matrix color transform). In another specific example, the arbitration rules 146 may indicate to perform color transforms requested by a brightness and/or contrast adjustment application with significant flexibility, as described above. In another specific example, the arbitration rules 146 may indicate to perform color transforms requested by a gamma LUT that it may have knowledge of (e.g., legacy gamma LUTs may not traverse the arbitration layer).

For example, the arbitration rules 146 may indicate to merge certain color transforms depending on what other color transforms are being requested. For example, for a blue light reduction application, where the color transform may be performed by a 3D LUT, 1D LUT, matrix, or parametric function, arbitration layer 144 may upconvert the 1D LUT color transform to a 3D LUT or matrix for merging where another application requests a 3D LUT or matrix operation, etc. In addition, the arbitration rules may specify to merge based on a loss associated with the merge operation (e.g., prefer lossless merges where possible, or where hardware capabilities or available resources allow). A specific arbitration example is shown in FIG. 4.

FIG. 4 illustrates a specific example of multiple applications and associated color transforms being modified and incorporated into a graphics pipeline 142, in accordance with aspects described herein. For example, a color calibration 402, color blindness accessibility application 404, brightness/contrast application 406, legacy LUT application 408, blue light reduction application 410, and/or ambient whitepoint application 412 can be provided. In this example, color calibration application 402 can request a 3D LUT 420, matrix 422, and 1D LUT 424 for providing a color calibration for visual content to calibrate a display device 102. Color blindness accessibility application 404, in this example, may include a 3D LUT 426 to modify colors to appear more desirable (e.g., more legible/distinguishable) for color blind eyes, brightness/contrast application 406 may include a parametric function 428 to modify colors to achieve a specified brightness and/or contrast appearance, legacy LUT application 408 may include a 1D LUT 430 to achieve a legacy functionality (e.g., gamma level), blue light reduction application 410 can include an absolute xy whitepoint 432, such as an International Commission on Illumination (CIE) xy whitepoint, which can also be alternatively represented as a matrix in one example, and ambient whitepoint application 412 can also include a xy whitepoint 434.

In this example, arbitration layer 144 can determine arbitration rules 146 for modifying the set of color transforms (e.g., to modify 3D LUT 420, matrix 422, 1D LUT 424, 3D LUT 426, parametric function 428, 1D LUT 430, xy whitepoint 432, and xy whitepoint 434) requested by the various applications, which may be based on hardware capability or to produce desired visual content based on combining the applications 402, 404, 406, 408, 410, 412, and/or corresponding color scenarios.

For example, arbitration layer 144 can mostly preserve (e.g. prioritize quality of) the color calibration application 402 by performing the 1D LUT 424 last. For example, arbitration layer 144 can, as a first operation based on arbitration rule(s) 146, reorder/prioritize quality of 1D LUT 424 to 1D LUT 436, and perform 1D LUT 436 in the 1D LUT 210 stage of the graphics pipeline 142 (e.g., without other 1D LUTs). As a second operation based on arbitration rule(s) 146, arbitration layer 144 can degrade the 1D LUT 430 to a parametric function 438, which can be a lossy operation (but may use fewer resources than performing 1D LUT operation at 1D LUT stage 210). As a third operation based on arbitration rule(s) 146, arbitration layer 144 can merge xy whitepoint 432 and xy whitepoint 434 into xy whitepoint 440, which may be a lossless operation, or may override one of xy whitepoint 432 and xy whitepoint 434 to produce xy whtiepoint 440, which may be a lossy operation. In either example, complexity of applying the xy whitepoint can be reduced by the operation.

As a fourth operation based on arbitration rule(s) 146, arbitration layer 144 can merge 3D LUT 420 with 3D LUT 426 to generate 3D LUT 442, which can be a lossy operation. This 3D LUT 442 can be applied in the 3D LUT 204 stage of the graphics pipeline 142. As a fifth operation based on arbitration rule(s) 146, arbitration layer 144 can merge parametric function 428 with the parametric function 444 from the second operation to produce parametric function 444, which can be a lossless operation. This parametric function 444 can be applied in the parametric function 206 stage of the graphics pipeline 142. As a sixth operation based on arbitration rule(s) 146, arbitration layer 144 can upconvert xy whitepoint 440 to a matrix 446, which can be a lossless operation. As a seventh operation based on arbitration rule(s) 146, arbitration layer 144 can merge matrix 422 and matrix 446 (e.g., via matrix multiplication) to generate matrix 448, which can be a lossless operation. This matrix 448 can be applied at the matrix 208 stage of the graphics pipeline. In this example, the various color transforms requested by the various applications 402, 404, 406, 408, 410, 412 can be modified to generate the arbitrated set of color transforms 442, 436, 444, 448 for applying in the graphics pipeline 142, which can reduce processing requirements, improve desired visual content properties, etc., as described.

Additionally, an application may specify requirements or parameters for the color transforms, such as numerical accuracy, numerical precision, size of a LUT, number of coefficients, type of interpolation, etc., and the arbitration layer 144 may also consider these requirements and/or parameters when modifying the set of color transforms or ordering thereof. For example, an application may specify a number of entries to be in a 1DLUT and/or a number of bits used to represent each entry. Thus, arbitration layer 144 may degrade a LUT by reducing a number of entries instead of a bitwidth of the entries where the bitwidth is already at a threshold indicated by the parameters.

In method 300, at action 318, visual content for display can be generated based at least in part on applying the arbitrated set of color transforms in the graphics pipeline, based on one or more arbitration rules, to generate an arbitrated set of color transforms. In an example, display driver 112, e.g., in conjunction with processor 104, memory 106, operating system 108, graphics pipeline 142, etc., can generate the visual content for display based at least in part on applying the arbitrated set of color transforms in the graphics pipeline (e.g., instead of the originally requested set of color transforms). For example, referring to FIG. 4, this can include applying reordered color transforms based on the first operation, applying merged 3D LUT based on the fourth operation, etc., as described above.

Figure 5:
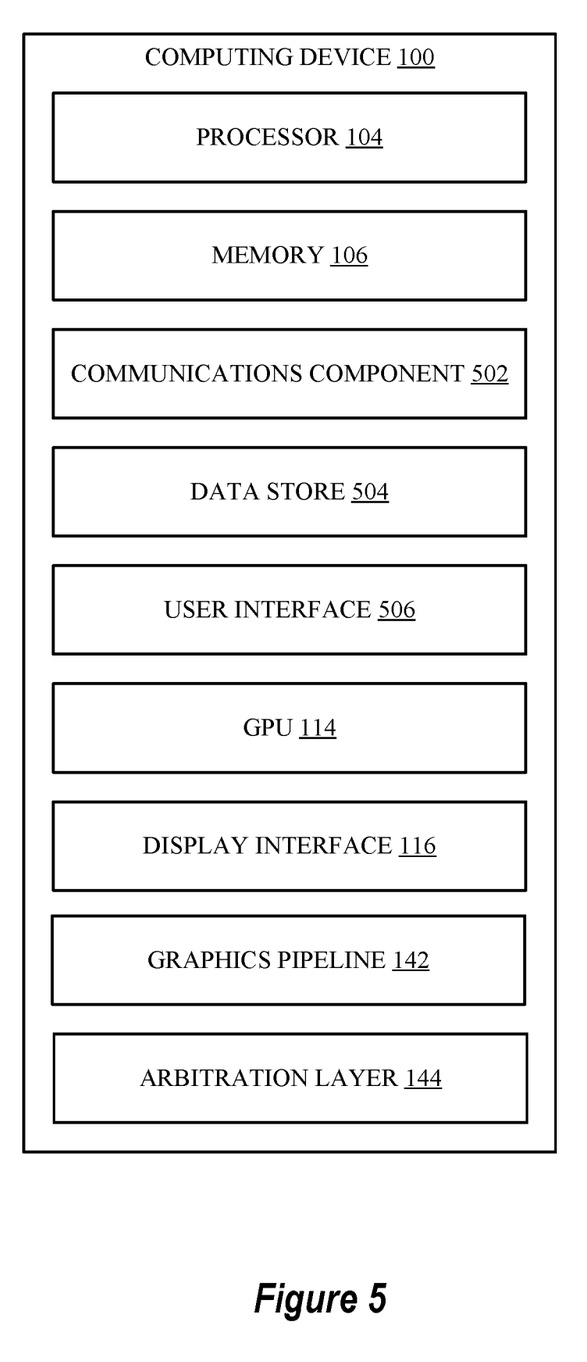
FIG. 5 is a schematic diagram of an example of a computing device for performing functions described herein.

FIG. 5 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, display drivers, etc., as described herein, and/or other components of the computing device 100.

Further, computing device 100 may include a communications component 502 that provides for establishing and maintaining communications with one or more other devices, parties, entities, etc. utilizing hardware, software, and services as described herein. Communications component 502 may carry communications between components on computing device 100, as well as between computing device 100 and external devices, such as devices located across a communications network and/or devices serially or locally connected to computing device 100. For example, communications component 502 may include one or more buses, and may further include transmit chain components and receive chain components associated with a wireless or wired transmitter and receiver, respectively, operable for interfacing with external devices.

Additionally, computing device 100 may include a data store 504, which can be any suitable combination of hardware and/or software, that provides for mass storage of information, databases, and programs employed in connection with examples described herein. For example, data store 504 may be or may include a data repository for applications and/or related parameters not currently being executed by processor 104. In addition, data store 504 may be a data repository for an operating system, application, display driver, etc. executing on the processor 104, and/or one or more other components of the computing device 100.

Computing device 100 may also include a user interface component 506 operable to receive inputs from a user of computing device 100 and further operable to generate outputs for presentation to the user (e.g., via display interface 116 to a display device). User interface component 506 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 506 may include one or more output devices, including but not limited to a display interface 116, a speaker, a haptic feedback mechanism, a printer, any other mechanism capable of presenting an output to a user, or any combination thereof.

Computing device 100 can also include a GPU 114, as described herein, for rendering frames based on rendering instruction received from processor 104. GPU 114 can additionally send signals via a display interface 116 to cause display of the rendered frames on a display device. Computing device 100 may also include a graphics pipeline 142 for modifying visual content via multiple stages (color transforms) and/or an arbitration layer 144 for modifying a set of requested color transforms, as described, to improve performance thereof on computing device 100.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for applying color transforms to visual content, comprising:
    determining a set of color transforms in a graphics pipeline that are requested by a plurality of applications, wherein the set of color transforms include at least a first color transform to be applied simultaneously with at least a second color transform, wherein a first application requests, via an operating system that executes the first application, the first color transform that adjusts an image for display on a display device, and wherein a second application requests, via the operating system that executes the second application, the second color transform that adjusts the image for display on the display device;
    modifying, based on one or more arbitration rules, at least one color transform of the set of color transforms or an ordering of the set of color transforms to generate an arbitrated set of color transforms; and
    generating the visual content for display based at least in part on applying the arbitrated set of color transforms in the graphics pipeline.

2. The method of claim 1, further comprising determining one or more hardware capabilities of a device that generates the visual content, wherein modifying the at least one color transform of the set of color transforms or the ordering of the set of color transforms is based at least in part on the one or more hardware capabilities.

3. The method of claim 1, further comprising determining execution resources available at a device that generates the visual content, wherein modifying the at least one color transform of the set of color transforms or the ordering of the set of color transforms comprises mapping, based additionally on the one or more arbitration rules, the set of color transforms to the execution resources.

4. The method of claim 1, wherein modifying the at least one color transform of the set of color transforms comprises degrading a complexity of one or more color transforms in the set of color transforms.

5. The method of claim 1, wherein modifying the at least one color transform of the set of color transforms comprises merging at least two color transforms in the set of color transforms into a single color transform for the arbitrated set of color transforms.

6. The method of claim 5, wherein merging the at least two color transforms comprises multiplying matrices of the at least two color transforms to generate a single matrix for the single color transform.

7. The method of claim 5, wherein merging the at least two color transforms comprises merging lookup tables of the at least two color transforms to generate a single lookup table for the single color transform.

8. The method of claim 5, wherein the at least two color transforms are requested by different ones of the plurality of applications.

9. The method of claim 8, wherein at least one of the at least two color transforms is one of multiple stages of color transforms requested by one of the plurality of applications.

10. The method of claim 5, wherein merging at least two color transforms comprises merging parametric functions of at least two color transforms to generate a single parametric function for the single color transform.

11. The method of claim 1, wherein modifying the at least one color transform of the set of color transforms comprises removing one or more color transforms from the set of color transforms.

12. The method of claim 1, wherein modifying the ordering of the set of color transforms comprises ordering the set such that the last color transform corresponds to one of the plurality of application to be prioritized over at least another one of the plurality of applications.

13. A computing device for applying color transforms to visual content, comprising:
a memory storing one or more parameters or instructions for executing an operating system and a plurality of applications;
a display interface coupled with the display device for communicating signals to display visual content on the display device; and
at least one processor coupled to the memory and the display interface, wherein at least one processor is configured to:
determine a set of color transforms in a graphics pipeline that are requested by the plurality of applications, wherein the set of color transforms include at least a first color transform to be applied simultaneously with at least a second color transform, wherein a first application requests, via an operating system that executes the first application, the first color transform that adjusts an image for display on a display device, and wherein a second application requests, via the operating system that executes the second application, the second color transform that adjusts the image for display on the display device;
modify, based on one or more arbitration rules, at least one color transform of the set of color transforms or an ordering of the set of color transforms to generate an arbitrated set of color transforms; and
generate the visual content for display based at least in part on applying the arbitrated set of color transforms in the graphics pipeline.

14. The computing device of claim 13, wherein at least one processor is further configured to determine one or more hardware capabilities of a device that generates the visual content, and wherein the at least one processor is configured to modify the at least one color transform of the set of color transforms or the ordering of the set of color transforms based at least in part on the one or more hardware capabilities.

15. The computing device of claim 13, wherein at least one processor is further configured to determine execution resources available at the computing device, wherein at least one processor is configured to modify the at least one color transform of the set of color transforms or the ordering of the set of color transforms at least in part by mapping, based additionally on the one or more arbitration rules, the set of color transforms to the execution resources.

16. The computing device of claim 13, wherein at least one processor is configured to modify the at least one color transform of the set of color transforms at least in part by degrading a complexity of one or more color transforms in the set of color transforms.

17. The computing device of claim 13, wherein at least one processor is configured to modify the at least one color transform of the set of color transforms at least in part by merging at least two color transforms in the set of color transforms into a single color transform for the arbitrated set of color transforms.

18. The computing device of claim 13, wherein at least one processor is configured to modify the at least one color transform of the set of color transforms at least in part by removing one or more color transforms from the set of color transforms.

19. A non-transitory computer-readable medium, comprising code executable by one or more processors for applying color transforms to visual content, the code comprising code for:
determining a set of color transforms in a graphics pipeline that are requested by a plurality of applications, wherein the set of color transforms include at least a first color transform to be applied simultaneously with at least a second color transform, wherein a first application requests, via an operating system that executes the first application, the first color transform that adjusts an image for display on a display device, and wherein a second application requests, via the operating system that executes the second application, the second color transform that adjusts the image for display on the display device;
modifying, based on one or more arbitration rules, at least one color transform of the set of color transforms or an ordering of the set of color transforms to generate an arbitrated set of color transforms; and
generating the visual content for display based at least in part on applying the arbitrated set of color transforms in the graphics pipeline.

20. The non-transitory computer-readable medium of claim 19, further comprising code for determining one or more hardware capabilities of a device that generates the visual content, wherein the code for modifying the at least one color transform of the set of color transforms or the ordering of the set of color transforms is based at least in part on the one or more hardware capabilities.

* * * * *